INVENTOR.
JAMES R. HARNISH
BY
Sidney N. Rosenfeld
ATTORNEY

May 29, 1962

J. R. HARNISH 3,036,441

AIR CONDITIONING SYSTEMS

Filed Oct. 11, 1960

INVENTOR.
JAMES R. HARNISH
BY
Sidney N. Rosenfeld
ATTORNEY

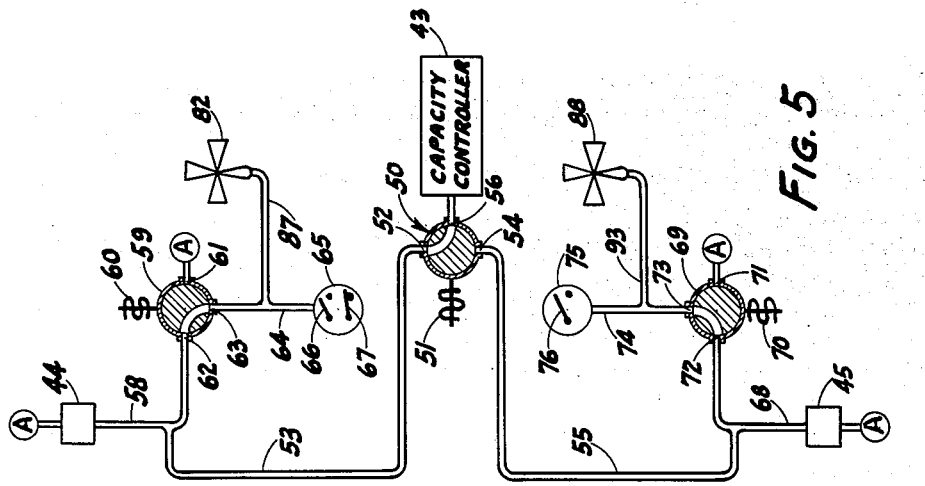
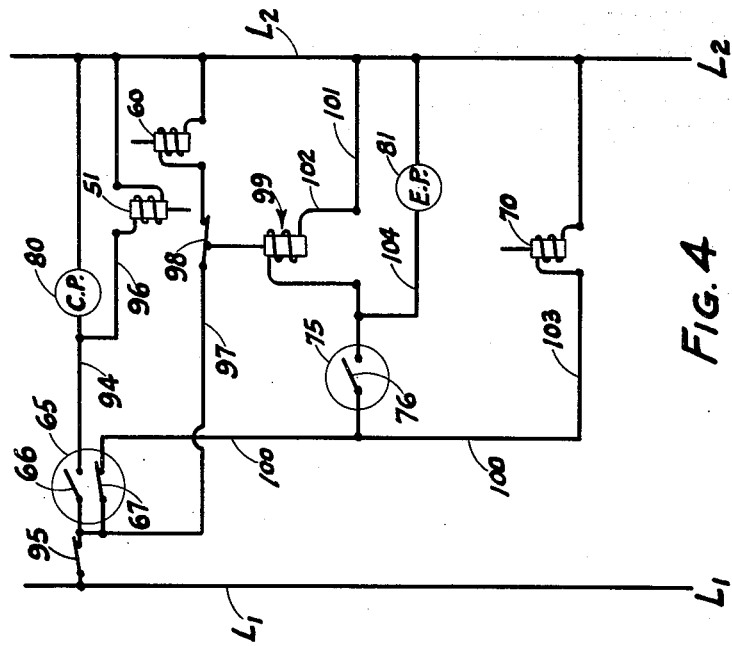

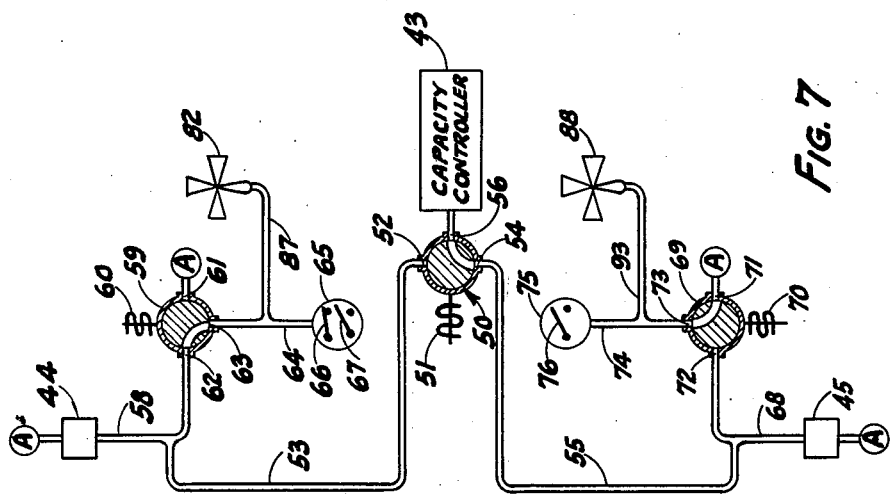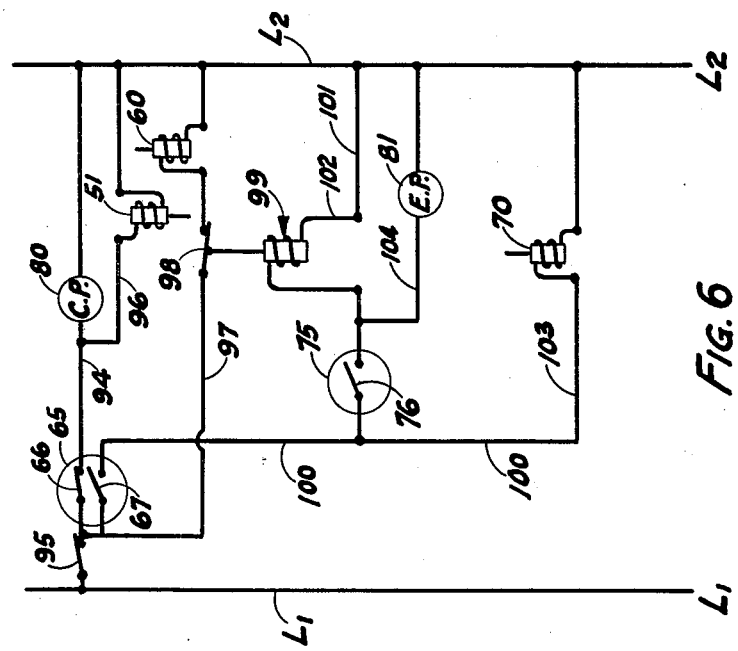

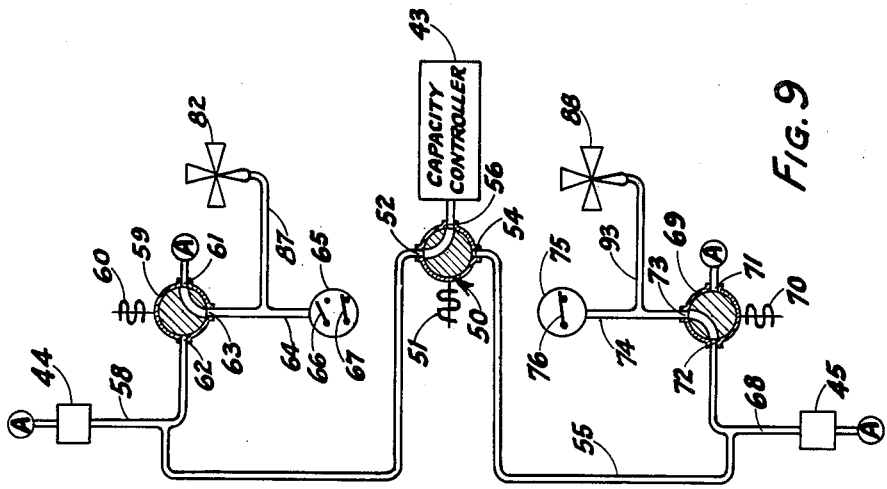
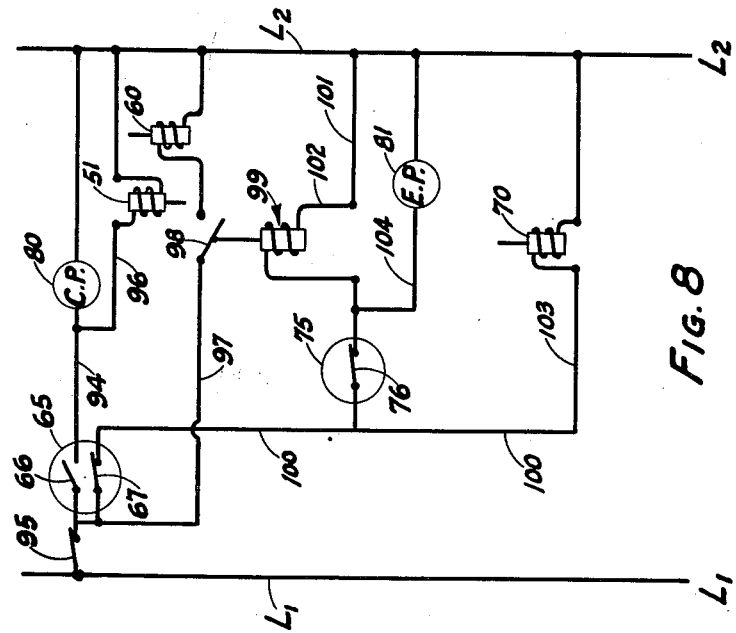

United States Patent Office 3,036,441
Patented May 29, 1962

3,036,441
AIR CONDITIONING SYSTEMS
James R. Harnish, Spring Garden Township, York County, Pa., assignor to Borg-Warner Corporation, Chicago, Ill., a corporation of Illinois
Filed Oct. 11, 1960, Ser. No. 61,944
10 Claims. (Cl. 62—159)

This invention relates to an air conditioning system. More specifically, the invention relates to an air conditioning system of the type shown in the application of William H. Divine and James R. Harnish, Serial No. 61,945, filed October 11, 1960.

In the aforementioned application, an air conditioning system, including a refrigerating system, is provided wherein the evaporator means and condenser means of the refrigerating system each comprises a single shell having a pair of tube bundles (heat-exchangers) therein. The one heat-exchanger in both the evaporator means and the condenser means receives the heat-exchange fluid to be either heated or chilled. The other heat-exchanger receives a fluid such as well or lake water, industrial process fluids, etc., to carry away excess heat from the condenser means during the summer cycle of operation and to provide additional heat to the evaporator means during the winter cycle of operation. Hereinafter, this latter fluid will be referred to as "well water". The well water dissipates excess heat from the condenser means during summer operation, and provides a source of heat for the evaporator means during the winter operation. Means must be provided for insuring that well water be supplied either the condenser means or evaporator means, dependent on conditions, but never to both simultaneously. In addition, it is desirable that the entire operation be automatic.

The present invention, therefore, relates to a control system for the above-disclosed air conditioning system for insuring that well water will be supplied automatically to either the condenser means or the evaporator means of the refrigerating system dependent on whether the system is on the summer or winter cycle. Further, the control system operates to insure that either the condenser means or evaporator means will be supplied well water, but never the two simultaneously.

It is an object of the invention to provide an air conditioning system of a type wherein a chilled conditioning medium and a heated conditioning medium are provided for air conditioning a building, and wherein the system is so constructed and arranged that well or lake water may be utilized, or other fluids as herein-before stated, both as a source of heat during winter operation and as a coolant source during summer operation, and wherein control means are provided for insuring that the well water may not be utilized simultaneously as a source of heat and as a coolant source.

Another object of the invention is to provide an air conditioning system, having a refrigerating system including evaporator means having a pair of heat-exchangers therein and condenser means having a pair of heat-exchangers therein, and wherein well water may be supplied to one of the heat-exchangers in said evaporator means during winter operation as a source of heat, and to one of the heat-exchangers in said condenser means during summer operation as a coolant source, the other heat-exchanger in said condenser and evaporator means receiving heat-exchange fluid to be heated and cooled respectively, and wherein control means are provided for automatically routing the well water to the evaporator heat-exchanger or condenser heat-exchanger, as required. Yet another object of the invention is to provide an air conditioning system of the type just above-mentioned, wherein the control means further include means for insuring that the well water is never supplied simultaneously to both the condenser means and evaporator means.

A still further object of the invention is to provide an air conditioning system having a refrigerating system including a compressor, evaporator means having a pair of heat-exchangers therein and condenser means having a pair of heat-exchangers therein (and a capacity controller for the compressor), and wherein well water may be supplied to one of the heat-exchangers in said evaporator means during winter operation as a source of heat, and to one of the heat-exchangers in said condenser means during summer operation as a coolant source, the other heat-exchanger in said condenser and evaporator means receiving heat-exchange fluid to be heated and cooled respectively, and wherein control means are provided for automatically routing the well water to the evaporator heat-exchanger or condenser heat-exchanger as required, said control means including a heating thermostat for controlling the compressor capacity controller during winter operation and the amount of well water used in the condenser means during summer operation, said control means further including a cooling thermostat for controlling the compressor capacity controller during summer operation and the amount of well water used in the evaporator means during winter operation. Another object is to provide an air conditioning system of the type just above-mentioned, wherein said control means include means for automatically switching the system between the heating cycle (well water supplied to the evaporator means) and the cooling cycle (well water supplied to the condenser means) dependent on whether the heating load or the cooling load is the greater. A still further object is to provide a system of the type just above-mentioned wherein said control means further include means for automatically placing the system in the proper operating cycle required (heating or cooling) after a shut down period.

The invention consists of the novel constructions, arrangements and devices to be hereinafter described and claimed for carrying out the above-stated objects and such other objects as will appear from the following description of a preferred embodiment of the invention described with reference to the accompanying drawings, in which:

FIGS. 4 and 5 are schematic representations of the FIG. 2 and FIG. 3 circuits respectively during the start-up phase of operation;

FIGS. 6 and 7 are schematic representations of the FIG. 2 and FIG. 3 circuits respectively during the summer cycle of operation; and FIGS. 8 and 9 are schematic representations of the FIG. 2 and FIG. 3 circuits respectively during the winter cycle of operation.

Like numerals refer to like parts throughout the several views.

Figure 1:
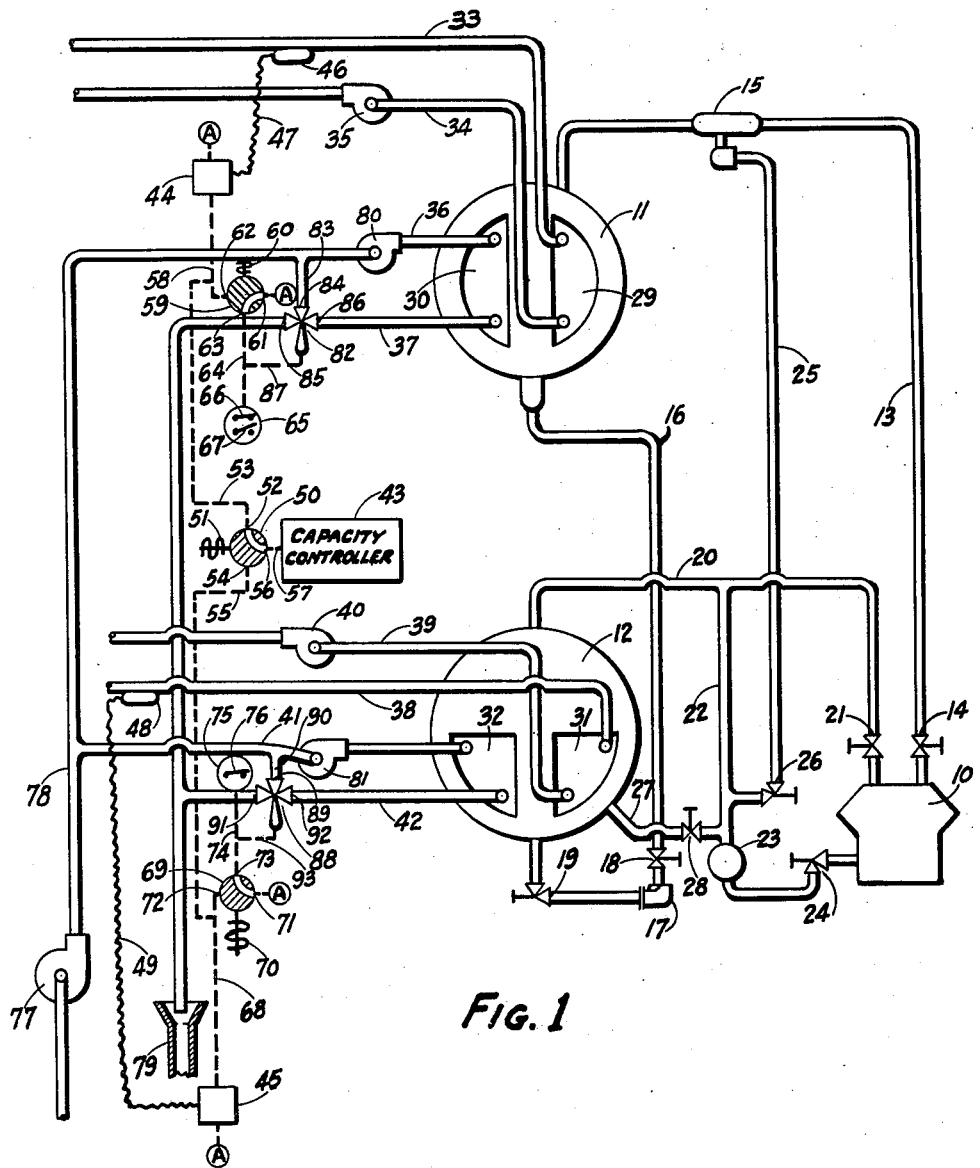
FIG. 1 is a schematic represetation of an air conditioning system according to the invention.

A refrigerating system comprises a compressor 10, condenser means 11, and evaporator means 12. A hot gas line 13, including a shut off valve 14 and an oil separator 15 leads from compressor 10 to condenser means 11. A hot liquid line 16 leads from condenser means 11 to evaporator means 12. Hot liquid line 16 has included therein a high pressure float 17, which serves as the dividing point between the high pressure part of the system and the low pressure part of the system. A shut off valve 18 and a shut off valve 19 are also provided in hot liquid line 16 upstream and downstream of the high pressure float 17 in order to isolate the float should this become necessary. A cold gas line 20 leads from the outlet of the evaporator means 12 to the suction of compressor 10. Cold gas line 20 has a shut off valve 21 therein, similar to shut off valve 14. A gas equalizing line 22 connects between cold gas line 20 and an oil receiver 23. An oil return line 23' connects the oil receiver 23 with the crank case of compressor 10 and contains a shut off valve 24. An oil return line 25 leads from separator 15 to oil receiver 23, and includes a shut off valve 26 therein. Yet another oil return line 27, including a shut off valve 28 therein, leads from a lower portion of evaporator means 12 to oil receiver 23.

Both condenser means 11 and evaporator means 12 are of the shell and tube type, wherein the tube bundles provided therein comprise heat-exchangers through which the liquid to be heated or cooled and the "well water" is passed while the refrigerant flows over the heat-exchangers. Condenser means 11 includes a pair of heat-exchangers 29 and 30 therein, while evaporator means 12 includes a pair of heat-exchangers 31 and 32 therein. As the explanation proceeds, it will be apparent that each condenser heat-exchanger or evaporator heat-exchanger may be provided with a separate shell with the refrigerant flow divided therebetween. In essence, in either case, there is effectively two refrigerant "condensers" and two refrigerant "evaporators"; the herein disclosed invention encompasses both cases.

Heat-exchanger 29 in condenser means 11 has connected thereto a heated water return line 33 and a heated water supply line 34. A pump 35 is connected into heated water supply line 34. Heat-exchanger 30 in condenser means 11 has connected thereto a well water supply line 36 and a well water return line 37. Heat-exchanger 31 in evaporator means 12 has connected thereto a chilled water return line 38 and a chilled water supply line 39. A pump 40 is connected into chilled water supply line 39. Heat-exchanger 32 in evaporator means 12 has connected thereto a well water supply line 41 and a well water return line 42.

A control circuit is provided for automatically supplying the proper amount of heated and chilled water to a building desired to be air conditioned. The control circuit automatically supplies well water to heat-exchanger 30 in condenser means 11 to dissipate heat picked up by the chilled water during that time of the year (summer cycle) when there is an excess of heat picked up by the chilled water over that which can be utilized in the heated water. Conversely, the control circuit automatically supplies well water to heat-exchanger 32 in evaporator means 12 at such times of the year when insufficient heat is picked up by the chilled water to supply the heating requirements of the building, the well water then acting as a source of heat.

The control circuit is electrical-pneumatic and includes a compressor capacity step controller 43 for controlling the capacity of compressor 10 in whatever increments are found to be desirable. Controller 43 is alternately controlled by either a heating thermostat 44 or a cooling thermostat 45. Both thermostats are supplied with a source A of air under 20 lbs. line pressure for transmission to various devices to be controlled, including step controller 43. These thermostats are of the type which vary the pressure supplied, dependent on the amount of variance of the temperature sensed from that set in the thermostats. Heating thermostat 44 has a thermostatic bulb 46 connected thereto by way of the usual capillary 47. Thermostatic bulb 46 is placed in heat-exchange relation with heated water return line 33. As the temperature of the water within the return line 33 drops, then heating thermostat 44 transmits a higher air pressure. The pressure transmitted by thermostat 44 varies from 3 p.s.i. to 13 p.s.i., with 3 p.s.i. being transmitted when the heating requirements of the system are at a minimum, and a continually higher pressure up to 13 p.s.i. as additional heating capacity is required. Cooling thermostat 45 has a thermostatic bulb 48 attached thereto by way of the usual capillary 49. Thermostatic bulb 48 is in heat-exchange relation with chilled water return line 38. Cooling thermostat 45 transmits an air pressure of from 3 p.s.i. to 13 p.s.i., dependent on the need for cooling, with 3 p.s.i. being transmitted when a minimum load exists on the chilled water circuit and a continually higher pressure transmitted, up to 13 p.s.i., as the chilled water load increases.

A three-way air line solenoid valve 50 is provided. Valve 50 is actuated by a solenoid 51. Valve 50 has a normally open port 52 connected by a pneumatic line 53 to heating thermostat 44. Valve 50 has a normally closed port 54 connected by pneumatic line 55 to cooling thermostat 45. A common port 56 of valve 50 is connected by pneumatic line 57 to compressor capacity controller 43.

A pneumatic line 58 leads from heating thermostat 44 to a three-way air line solenoid valve 59, operated by solenoid 60. Valve 59 has a normally open port 61 leading to source A of air at a line pressure of 20 lbs. Valve 59 has a normally closed port 62 adapted to receive the varying pneumatic signal from heating thermostat 44. A common port 63 is connected by way of a pneumatic line 64 to a pneumatic-electric switch 65, including a normally closed contact 66 and a normally open contact 67 therein. Common port 63 transmits either the 20 lb. line pressure or the pressure received from heating thermostat 44 to pneumatic-electric switch 65. It will be noted that pneumatic line 53, leading from valve 50, joins with pneumatic line 58, intermediate heating thermostat 44, and solenoid valve 59.

Cooling thermostat 45 is connected by way of a pneumatic line 68 to a three way air line solenoid valve 69 operated by a solenoid 70. Valve 69 includes a normally open port 71, a normally closed port 72, and a common port 73. Normally open port 71 is connected to source "A" of air at line pressure of 20 lbs. Normally closed port 72 is adapted to receive the varying pneumatic signal from cooling thermostat 45. Common port 73 is connected by way of a pneumatic line 74 to a pneumatic-electric switch 75, having a normally closed contact 76 therein. Common port 73 transmits either the 20 lb. line pressure or the pressure received from cooling thermostat 45 to pneumatic-electric switch 75.

A pump 77 is provided for pumping well water to be supplied heat-exchangers 30 and 32. A well water header 78 receives the well water from pump 77 and is connected to well water supply lines 36 and 41. A well water waste header 79 is also provided, and is connected to well water return lines 37 and 42 for receiving well water flowing from heat-exchangers 30 and 32, and returning the same to waste. A pump 80 is provided in well water supply line 36, while a pump 81 is provided in well water supply line 41. Well water return line 37 has a three-way valve 82 therein for bypassing water back to pump 80 when such is desirable. For this purpose, a bypass line 83 is provided between well water supply line 36 and a normally closed port 84 of valve 82. Valve 82 also includes a normally open port 85 and a common port 86. Valve 82 is pneumatically operated and is adapted to receive, by way of a pneumatic line 87, the varying pressure supplied by heating thermostat 44 through valve 59. Line 87 joins pneumatic line 64 downstream of valve 59.

Well water return line 42 has a three-way valve 88 therein. Valve 88 has a normally closed port 89 connected to well water supply line 41 by way of a line 90. Valve 88 also includes a normally open port 91 and a common port 92. Similarly to valve 82, valve 88 is adapted to receive, by way of a pneumatic line 93, the varying air pressure supplied from cooling thermostat 45 through valve 69. Line 93 joins pneumatic line 74 downstream of valve 69.

Figure 2:
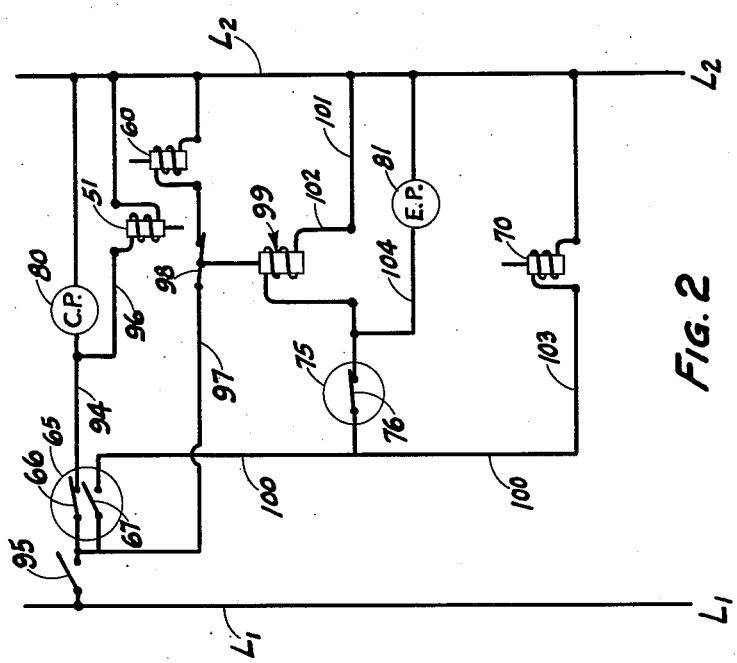
FIG. 2 is a schematic representation of an electrical circuit for the control system of the invention, showing the various components thereof in a normal or non-operative position.

Turning now to FIG. 2, the electrical circuit will be explained. A pair of leads L–1 and L–2 have various circuits connected between them. A line 94 is connected between L–1 and L–2, and includes therein a master switch 95. In addition, line 94 includes therein normally closed contact 66 of pneumatic-electric switch 65 (operated by pressure transmitted by the heating thermostat), and the electrical starting mechanism (not shown) of the condenser well water pump 80. A line 96 leads from line 94 to L–2 and includes the solenoid 51 of three-way air line solenoid valve 50. A line 97 leads from line 94 on the L–1 side of switch 65 to lead L–2. Line 97 includes therein a normally closed contact 98 of a relay 99 and the solenoid 60 of three-way air line solenoid valve 59. A line 100 leads from line 97 to L–2. Line 100 includes therein the normally open contact 67 of pneumatic-electric switch 65. Line 101 includes therein the normally closed contact 76 of pneumatic-electric switch 75 and a solenoid 102 for actuating relay 99. A line 103 is connected between line 100 and L–2, and includes the solenoid 70 of three-way air line solenoid valve 69. A line 104 is connected between line 101, downstream of switch 75, and L–2. Line 104 includes the electrical starting mechanism (not shown) of evaporator well water pump 81.

*Operation*

Assume that the system has been shut down during the night and, therefore, the heated water temperature is below its desired level, while the chilled water temperature is above its desired level. Pneumatic-electric switch 65 is designed to reverse at 13 pounds pressure or greater, and to assume its normal position (contact 66 closed, contact 67 open) at pressures of 12 p.s.i. or less. Pneumatic-electric switch 75 is designed to open at 13 pounds or greater pressure, and to assume its normally closed position at 12 pounds pressure or under.

Bypass valves 82 and 88 have pilot positioners to control from 3 p.s.i. to 13 p.s.i., with each valve bypassing well water to the pump suction at 13 p.s.i. and returning all well water to waste at 3 p.s.i.

Figure 3:
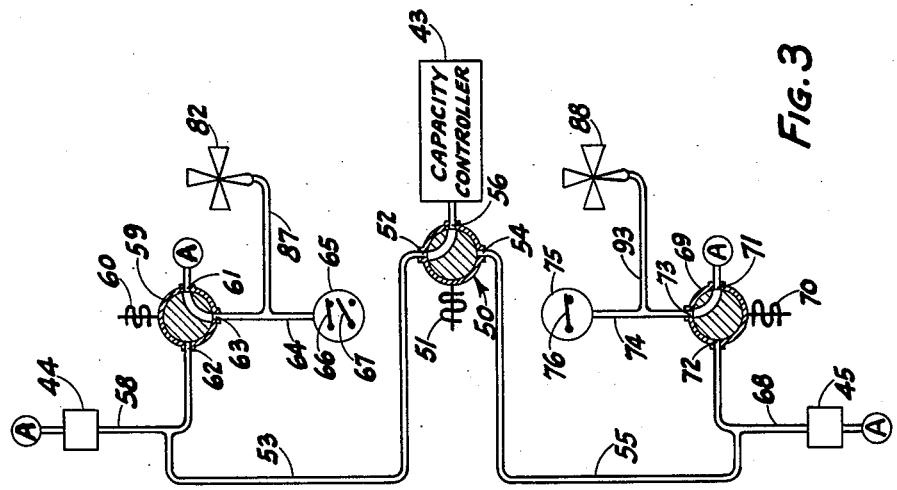
FIG. 3 is a schematic representation of the control circuit in its normal or non-operative, non-pressure position, and corresponding to the FIG. 2 electrical circuit representation.

The electrical and control circuits are in their non-operative or normal position as shown in FIGS. 2 and 3.

Referring now to FIGS. 4 and 5, when the master switch 95 is thrown, a circuit is set up by way of line 97 to solenoid 60 of three-way air line solenoid valve 59. This reverses the valve and opens the normally closed port 62, while closing the normally open port 61. This allows the heating thermostat 44 to supply the pneumatic signal to pneumatic-electric switch 65. Since the heated water temperature is below its desired level, a full 13 pound pressure is supplied to switch 65, reversing the switch and closing contact 67 and opening contact 66. With contact 67 closed, solenoid 70 is energized, reversing the valve 69, opening the normally closed port 72 and closing the normally open port 71. This allows the cooling thermostat 45 to supply a varying pneumatic signal to pneumatic-electric switch 75. With the chilled water above its desired temperature, full 13 pound pressure is supplied switch 75, reversing it from its normal position.

With both pneumatic-electric switches 65 and 75 reversed, solenoid 51 is de-energized and the heating thermostat 44 supplies a varying pneumatic pressure to the compressor capacity step controlled 43 to regulate compressor capacity. Solenoid 60 is energized, as aforesaid, and valve 59 reversed, allowing the heating thermostat 44 to control three-way valve 82. Solenoid 70 is energized, as set out above, and valve 69 reversed, to permit the cooling thermostat 45 to control three-way valve 88. At the 13 p.s.i. pressure transmitted by both thermostats, valves 82 and 88 are set to bypass all well water back to the respective pump suctions. Neither of the well water pumps 80 and 81 will operate, since contacts 66 and 76 are opened (reversed), breaking the circuits to the respective pumps.

The above represents the condition of the system after a normal shut down period, irrespective of whether the system is on the summer or winter cycle of operation. The following sequences will then occur, dependent on whether the system is on a summer cycle of operation or a winter cycle of operation:

*Summer cycle of operation.*—Turning now to FIGS. 6 and 7, on the summer cycle the heated water will heat up before the chilled water cools down. Under this circumstance, heating thermostat 44 sends a lesser pressure to pneumatic-electric switch 65. As soon as the pressure drops to 12 p.s.i. or lower, pneumatic-electric switch 65 reverses, assuming its normal position, as shown. With contact 66 closed, condenser well pump 80 is then activated, placing the pump in operation to pump well water through the heat-exchanger 30 to help dissipate excess heat. Solenoid 51 of valve 50 becomes energized, reversing the valve and closing normally open port 52 and opening normally closed port 54, placing the capacity controller 43 under control of the cooling thermostat 45. As the temperature of the chilled water is lowered, thermostat 45 will transmit a lesser pneumatic signal to capacity controller 43, cutting down the capacity of compressor 10. The converse also occurs. With contact 67 open, solenoid 70 is de-energized, reversing the solenoid valve 69 to its normal position, allowing the full 20 pounds line pressure from source A to pass through the valve to pneumatic-electric switch 75 to insure that normally closed contact 76 remains in its open position. Also, full 20 pounds line pressure is placed on three-way valve 88 to keep the valve in bypass position. Solenoid 60 remains energized so that the heating thermostat 44 controls three-way valve 82 to permit varying amounts of well water to return to waste to dissipate excess condenser heat. With contact 76 opened, evaporator pump 81 is inoperative.

*Winter cycle of operation.*—If, after start up (see FIGS. 4 and 5), the chilled water cools down before the heated water reaches the control point, the system goes on a winter cycle as shown in FIGS. 8 and 9. Cooling thermostat 45 sends a lesser pressure to pneumatic electric switch 75. At such time as the pressure drops below 13 p.s.i., the switch 75 reverses, assuming its normal position as shown in FIGS. 8 and 9, with contact 76 closed. With contact 76 closed, the evaporator pump 81 is activated, placing the pump in operation to pump well water through the heat-exchanger 32 to provide an additional source of heat. Relay 99 is energized, opening normally closed contact 98, thereby breaking the electrical circuit to solenoid 60. This reverses three-way solenoid valve 59 to its normal position, placing full line pressure of 20 pounds from source A on pneumatic-electric switch 65, maintaining it in its reversed position (contact 66 open, contact 67 closed), which keeps condenser well water pump 80 from starting. Full 20 pound line pressure is also transmitted to three-way valve 82, keeping it in a fully bypassed position. Solenoid 70 remains energized, maintaining three-way valve 88 under the control of cooling thermostat 45. Solenoid 51 remains de-energized, leaving step controller 43 under the control of the heating thermostat 44.

*Transition—cooling load becomes greater than heating load.*—When operating on the basic heating cycle, the cooling load may become greater than the heating requirement of the building, causing the cycle to reverse. As the air pressure from the cooling thermostat 45 to pneumatic-electric switch 75 becomes higher than 13 p.s.i., indicating a need for a lower chilled water temperature, then switch 75 reverses, opening contact 76. With contact 76 open, relay 99 is de-energized, permitting contact 98 to close, energizing solenoid 60. With solenoid 60 energized, valve 59 is positioned such that the heating thermostat 44 controls switch 65. Since the need for heating is dropping, the heating thermostat 44 sends out a lower signal than 13 p.s.i., permitting switch 65 to reverse and assume its normal position, with contact 66 closed and contact 67 open. With contact 66 closed, condenser pump 80 becomes operative and solenoid 51 is energized, placing the capacity controller 43 under the control of the cooling thermostat 45. With contact 67 open, solenoid 70 is de-energized, reversing valve 69 and putting full 20 pound line pressure from source A on switch 75, locking it into open position and also putting full 20 pound line pressure on valve 88. Since the contact 76 of switch 75 is open, the evaporator pump 81 is inoperative. At the same time, heating thermostat 44 sends a varying pressure to three-way valve 82.

*Transition—heating load becomes greater than cooling load.*—When operating on the basic cooling cycle, should the heating requirement become greater than the cooling requirement, the heated water temperature to the heating coil falls, resulting in an increase in pressure to switch 65. When the pressure reaches 13 p.s.i., the switch reverses from its normal position, opening contact 66 and closing contact 67. With contact 66 open, the condenser pump 80 becomes inoperative and solenoid 51 is de-energized. De-energizing solenoid 51 puts the capacity controller 43 under the control of the heating thermostat 44. At the same time, with contact 67 closed, solenoid 70 is energized, reversing valve 69 and placing switch 75 under the control of the cooling thermostat 45. With the demand for cooling dropping, a less-than-13 p.s.i. signal is sent to switch 75, permitting contact 76 to close. With contact 76 closed, evaporator pump 81 becomes operative. Also, relay 99 is energized, opening contact 98 and de-energizing solenoid 60. With solenoid 60 de-energized, valve 59 is reversed and full 20 pound line pressure is supplied to switch 65, maintaining it in its reverse position, and also supplied to valve 82, maintaining it in its fully bypassed position. The varying pressure from cooling thermostat 45 is supplied three-way valve 88 to suitably position the same.

As set out herein above, and in the claims, the term "well water" refers to any fluid, such as well or lake water, industrial process fluids, etc., which may be utilized to carry away excess heat from the condenser during the summer cycle of operation and to provide additional heat to the evaporator during the winter cycle of operation.

I wish it to be understood that my invention is not to be limited to the specific constructions and arrangements shown and described. By way of example, instead of two separate pumps for supplying well water to the condenser and evaporator, one pump could be utilized with a three-way valve. The three-way valve could then be controlled by the heating and cooling thermostats to divert the well water to either the condenser or the evaporator, according to the particular cycle under which the system is operating. It will be apparent to those skilled in the art that many changes may be made without departing from the principles of the invention. The invention is, therefore, to be limited only insofar as the claims may be so limited.

I claim:

1. An air conditioning system for supplying a heated and a chilled heat-exchange fluid to a building to be conditioned comprising a refrigerating apparatus, said refrigerating apparatus including a compressor, condenser means including a pair of heat-exchangers, evaporator means including a pair of heat-exchangers, and refrigerant flow lines connecting said compressor, condenser means and evaporator means into a closed refrigerant circuit; means for supplying heat-exchange fluid to one of said condenser heat-exchangers to be heated; means for supplying heat-exchange fluid to one of said evaporator heat-exchangers to be chilled; means for supplying well water to the second condenser heat-exchanger or the second evaporator heat-exchanger; and control means for automatically switching the system between the heating cycle wherein well water is supplied to said second evaporator heat-exchanger and the cooling cycle wherein well water is supplied to said second condenser heat-exchanger dependent on whether the building heating load or cooling load is the greater.

2. The system of claim 1, said control means including means for automatically placing the system in the heating or cooling cycle as required after a shut-down period.

3. The system of claim 1, wherein said condenser means and evaporator means each comprises a single shell, each said shell having said pair of heat-exchangers therein.

4. In an air conditioning system for supplying a heated and a chilled heat-exchange fluid to a building to be conditioned, said system including a compressor, condenser means including a pair of heat-exchangers, evaporator means including a pair of heat-exchangers, refrigerant flow lines connecting said compressor, condenser means and evaporator means into a closed refrigerating circuit, means for supplying heat-exchange fluid to one of said condenser heat-exchangers to be heated, means for supplying heat-exchange fluid to one of said evaporator heat-exchangers to be chilled, and means for supplying well water to the second condenser heat-exchanger or the second evaporator heat-exchanger; means for automatically switching the system between the heating cycle wherein well water is supplied to said second evaporator heat-exchanger and the cooling cycle wherein well water is supplied to said second condenser heat-exchanger dependent on whether the heating load or the cooling load is the greater; and means for automatically placing the system in the heating or cooling cycle as required after a shut-down period.

5. In an air conditioning system for supplying a heated and a chilled heat-exchange fluid to a building to be conditioned, said system including a compressor, condenser means including a pair of heat-exchangers, evaporator means including a pair of heat-exchangers, refrigerant flow lines connecting said compressor, condenser means and evaporator means into a closed refrigerating circuit, means for supplying heat-exchange fluid to one of said condenser heat-exchangers to be heated, means for supplying heat-exchange fluid to one of said evaporator heat-exchangers to be chilled, and means for supplying well water to the second condenser heat-exchanger or the second evaporator heat-exchanger; the improvement comprising a heating thermostat and a cooling thermostat, said thermostats controlling said last mentioned means; means rendering said heating thermostat effective to supply said well water to said second condenser heat-exchanger when the building cooling load is greater than the heating load; and means rendering said cooling thermostat effective to supply said well water to said second evaporator heat-exchanger when the building heating load is greater than the cooling load.

6. An air conditioning system for supplying a heated and a chilled heat-exchange fluid to a building to be conditioned, comprising a refrigerating apparatus, said apparatus including a compressor, condenser means including a pair of heat-exchangers, evaporator means including a pair of heat-exchangers, and refrigerant flow lines connecting said compressor, condenser means and evaporator means into a closed refrigerant circuit; means for supplying heat-exchange fluid to one of said condenser heat-exchangers to be heated; means for supplying the heat-exchange fluid to one of said evaporator heat-exchangers to be chilled; pump means for supplying well water to the second condenser heat-exchanger or the second evaporator heat-exchanger; a heating thermostat and a cooling thermostat, said thermostats controlling said pump means; means rendering said heating thermostat effective to supply said well water to said second condenser heat-exchanger when the building cooling load is greater than the heating load, and means rendering said cooling thermostat effective to supply said well water to said second evaporator heat-exchanger when the building heating load is greater than the cooling load.

7. The system of claim 6, said condenser means and evaporator means each comprising a single shell, each said shell having said pair of heat-exchangers therein.

8. In an air conditioning system for supplying a heated and a chilled heat-exchange fluid to a building to be conditioned, said system including a compressor, a compressor capacity controller, condenser means including a pair of heat-exchangers, evaporator means including a pair of heat-exchangers, refrigerant flow lines connecting said compressor, condenser means and evaporator means into a closed refrigerating circuit, means for supplying heat-exchange fluid to one of said condenser heat-exchangers to be heated, means for supplying heat-exchange fluid to one of said evaporator heat-exchangers to be chilled, and means for supplying well water to the second condenser heat-exchanger or the second evaporator heat-exchanger; a heating thermostat and a cooling thermostat, said thermostats controlling said last-mentioned means and said compressor capacity controller; means rendering said heating thermostat effective to supply said well water to said second condenser heat exchanger when the building cooling load is greater than the heating load and to control said compressor capacity controller when the heating load is greater than the cooling load; and means rendering said cooling thermostat effective to supply said well water to said second evaporator heat-exchanger when the building heating load is greater than the cooling load and to control said compressor capacity controller when the cooling load is greater than the heating load.

9. In the system of claim 8, means for automatically placing the system in the heating or cooling cycle as required after a shut-down.

10. An air conditioning system for supplying a heated and a chilled heat-exchange fluid to a building to be conditioned comprising a refrigerating apparatus, said apparatus including a compressor, a compressor capacity controller, condenser means and evaporator means each including a pair of heat-exchangers therein, and refrigerant flow lines connecting said compressor, condenser means and evaporator means into a closed refrigerant circuit; means for supplying heat-exchange fluid to one of said condenser and evaporator heat-exchangers to be heated and chilled respectively; pump means for supplying well water to the second condenser heat-exchanger; pump means for supplying well water to the second evaporator heat-exchanger; a heating thermostat and a cooling thermostat, said thermostats controlling said pump means and said compressor capacity controller; means rendering said heating thermostat effective to supply said well water to said second condenser heat-exchanger when the building cooling load is greater than the heating load and to control said compressor capacity controller when the heating load is greater than the cooling load; and means rendering said cooling thermostat effective to supply said well water to said second evaporator heat-exchanger when the building heating load is greater than the cooling load and to control said compressor capacity controller when the cooling load is greater than the heating load.

References Cited in the file of this patent

UNITED STATES PATENTS

| | | |
|---|---|---|
| 2,279,657 | Crawford | Apr. 14, 1942 |
| 2,299,531 | Crawford | Oct. 20, 1942 |
| 2,935,857 | McFarlan | May 10, 1960 |